(No Model.)

G. W. SEEBACK.
PIPE COUPLING.

No. 480,374. Patented Aug. 9, 1892.

WITNESSES:

INVENTOR
Geo. W. Seeback

UNITED STATES PATENT OFFICE.

GEORGE W. SEEBACK, OF NEW YORK, N. Y.

PIPE-COUPLING.

SPECIFICATION forming part of Letters Patent No. 480,374, dated August 9, 1892.

Application filed June 1, 1892. Serial No. 435,186. (No model.)

*To all whom it may concern:*

Be it known that I, GEORGE WILLIAM SEE-BACK, a citizen of the United States of America, and a resident of the city, county, and State of New York, have invented certain new and useful Improvements in Pipe-Couplings, of which the following is a specification.

The invention relates to train-pipe couplings for fluid-pressure air-brakes; and its object is to provide an improved coupling which is simple and durable in construction and arranged to securely hold the members coupled and to automatically and securely close each member of the coupling when the members are separated in uncoupling the same.

The invention consists of a pivoted arm pressed by a spring coiled on a rod mounted to turn and loosely engaging the said arm to swing with the same.

The invention also consists of various parts and details and combinations of the same, as hereinafter more fully described, and pointed out in the claims.

Reference is to be had to the accompanying drawings, forming part of this specification, in which like letters indicate corresponding parts in all the figures.

Figure 1:
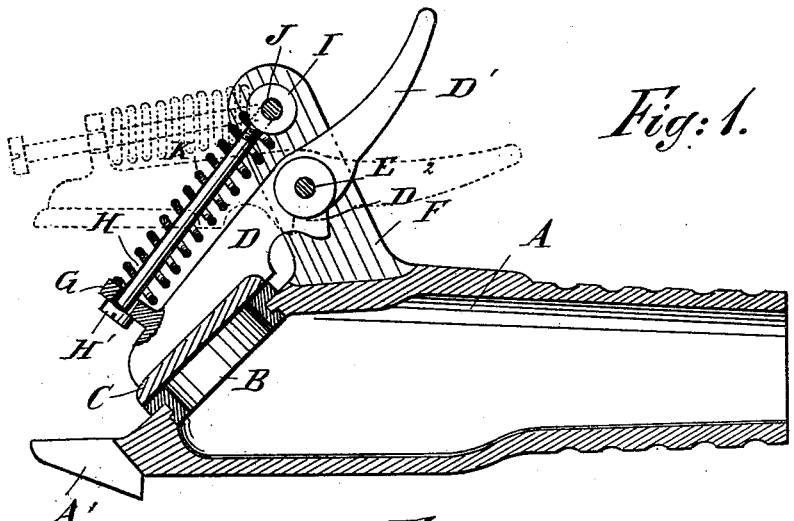
Figure 3:
Figure 2:
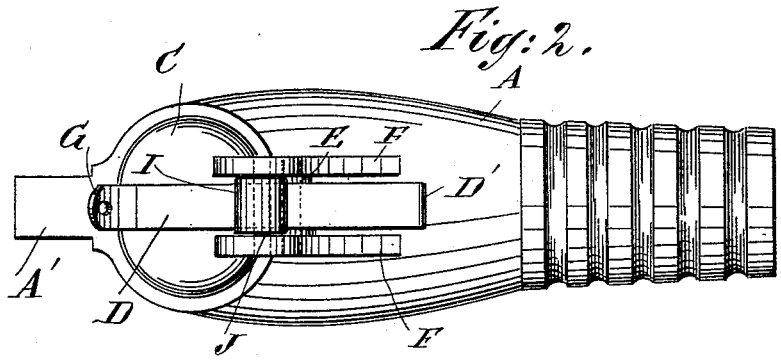
Figure 4:

Figure 1 is a sectional side elevation of the improvement as applied on a single member of the coupling. Fig. 2 is a plan view of the same with the spring and rod removed. Fig. 3 is a side elevation of the coiled spring, and Fig. 4 is a side elevation of the rod.

Each member A of the train-pipe coupling is provided at its front end with a bushing B, arranged at an angle of forty-five degrees to the axis of the coupling and forming a seat for the disk valve C, having a handled arm D mounted to turn on a pivot-pin E, held in the bracket or lugs F, projecting from the member A, and between which the said arm D passes. Near the front end of the arm D is formed an apertured lug G, through which passes loosely a rod H, screwed or otherwise secured in a collar I, mounted to turn loosely on a pivot-pin J, also held in the brackets F above the pivot-pin E. On this rod H is coiled a spring K, resting with its outer end on the lug G and with its inner end on the collar I. On the extreme outer end of the pin H is preferably formed a head H' for conveniently screwing the inner end of the rod H in the sleeve I in assembling the several parts or when replacing a worn-out or broken spring K by a new one.

On the under side of the arm D near the pivot E is formed a hook or lug $D^2$, and a similar hook or lug A' projects from the front end of the member A. In coupling the two members A of a coupling the operator presses the handles D' of the valve-arms D and then moves the two members in contact with each other, so that the outer surface of the bushings B touch each other and the lug A' of one member engages the lug $D^2$ of the other member. Now it will be seen that communication is established between the two members of the coupling and the members are held securely in place by the springs K pressing the arms D, and consequently the lugs $D^2$, in firm contact with the lugs A'. It is understood that in pressing the handle D' to unseat the valve C, as above described, the spring K is considerably compressed, so that when the corresponding lug $D^2$ is in engagement with its lug A' of the other member, then the pressure of the spring is transmitted to the contacting lugs $D^2$ and A' to hold the two members in firm contact at their bushings B.

When it is desired to uncouple the two members, the operator presses the handles D' to disengage the lugs $D^2$ from the lugs A' to permit of drawing the members apart. When this is done and the operator releases the pressure on the handles, then the springs K force the valves C shut—that is, each arm D swings inward until its valve C is seated on the bushing B and the member is securely closed at its outer end.

It will be seen that the device is very simple in construction, easily manipulated, not liable to get out of order, and in case of the spring K becoming worn or broken it can be readily removed by unscrewing the rod H from the collar I. A new spring can then be placed between the collar I and lug G and the rod H again inserted by passing it through the aperture in the lug G, the coiled spring K, and screwing it into the collar I. It is further understood that when the arm D and valve C swing outward the lug G moves toward the pivot-pin J, carrying the collar I, so that the spring K is compressed, the rod H at the same time swinging outward with the arm D and its free end sliding outward through the lug G, as will be readily understood by reference to the dotted position of the several parts, as shown in Fig. 1.

Having thus described my invention, what I desire to secure by Letters Patent is—

1. A device of the class described, comprising a valve held on a pivoted arm, a spring pressing on the free end of the said pivoted arm, and a rod mounted to swing and loosely connected with the said arm to swing with the latter, the said spring being coiled on the said rod, substantially as shown and described.

2. In a device of the class described, the combination, with a pivoted arm carrying a lug adapted to engage a lug on the other coupling member, of a pivoted rod loosely engaging with its free end the free end of the said pivoted arm to swing with the latter and a spring coiled on the said rod, substantially as shown and described.

3. In a device of the class described, the combination, with a pivoted arm carrying a disk valve and provided with a lug adapted to engage a lug on the other coupling member, a collar mounted to turn above the pivot of the said arm, a rod fastened to the said collar and loosely engaging the outer end of the said arm, and a spring coiled on the said rod and pressing with one end on the said arm and resting with its other end on the said collar, substantially as shown and described.

In testimony that I claim the foregoing as my invention I have signed my name, in presence of two witnesses, this 28th day of May, 1892.

GEORGE W. SEEBACK.

Witnesses:
NICOLAUS UNMUTH,
CHARLES NIDA.